(12) United States Patent
Tomizawa et al.

(10) Patent No.: US 8,502,917 B2
(45) Date of Patent: Aug. 6, 2013

(54) IMAGE PROCESSING CIRCUIT, IMAGE DISPLAY DEVICE, AND AN IMAGE PROCESSING METHOD

(75) Inventors: Kazunari Tomizawa, Soraku-gun (JP); Makoto Shiomi, Tenri (JP); Hidekazu Miyata, Nagoya (JP); Koichi Miyachi, Soraku-gun (JP); Akihito Jinda, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 10 days.

(21) Appl. No.: 12/929,861

(22) Filed: Feb. 22, 2011

(65) Prior Publication Data

US 2011/0141370 A1 Jun. 16, 2011

Related U.S. Application Data

(60) Division of application No. 11/723,021, filed on Mar. 15, 2007, now Pat. No. 7,916,213, which is a continuation of application No. 11/407,891, filed on Apr. 21, 2006, now Pat. No. 7,408,588, which is a continuation of application No. 10/128,946, filed on Apr. 24, 2002, now Pat. No. 7,068,320.

(30) Foreign Application Priority Data

Apr. 27, 2001 (JP) ................................. 2001-133564
Mar. 27, 2002 (JP) ................................. 2002-89845

(51) Int. Cl.
*H04N 7/01* (2006.01)
(52) U.S. Cl.
USPC ........................................................ 348/448

(58) Field of Classification Search
None
See application file for complete search history.

(56) References Cited

U.S. PATENT DOCUMENTS

| 5,386,253 | A | 1/1995 | Fielding |
| 5,428,398 | A | 6/1995 | Faroudja |
| 5,625,421 | A | 4/1997 | Faroudja et al. |
| 5,844,617 | A | 12/1998 | Faroudja et al. |
| 5,867,225 | A | 2/1999 | Keating et al. |
| 5,940,141 | A | 8/1999 | Faroudja et al. |
| 5,959,681 | A | 9/1999 | Cho |
| 5,990,982 | A | 11/1999 | Gove et al. |
| 6,144,412 | A | 11/2000 | Hirano et al. |
| 6,188,725 | B1 | 2/2001 | Sugiyama |
| 6,392,706 | B1 | 5/2002 | Sugiyama |

(Continued)

FOREIGN PATENT DOCUMENTS

| CN | 1158052 A | 8/1997 |
| GB | 2110900 A | 6/1983 |

(Continued)

OTHER PUBLICATIONS

Japanese Office Action dated May 31, 2011.

(Continued)

*Primary Examiner* — Paulos M Natnael
(74) *Attorney, Agent, or Firm* — Harness, Dickey & Pierce, P.L.C.

(57) ABSTRACT

The present invention is arranged such that interlace image data, which has been supplied, is converted to progressive image data in an I/P conversion section, and the image data converted to progressive style in the I/P conversion section is subjected to image processing including data comparison in spatial or time series manner, in an image processing section.

4 Claims, 18 Drawing Sheets

U.S. PATENT DOCUMENTS

| | | |
|---|---|---|
| 6,411,333 B1 | 6/2002 | Auld et al. |
| 6,493,023 B1 | 12/2002 | Watson |
| 6,522,339 B1 | 2/2003 | Orimo |
| 6,538,696 B2 | 3/2003 | Hieda et al. |
| 6,545,719 B1 | 4/2003 | Topper |
| 6,577,349 B1 | 6/2003 | Yamaguchi et al. |
| 6,728,317 B1 | 4/2004 | Demos |
| 6,788,812 B1 | 9/2004 | Wilkins |
| 6,867,814 B2 | 3/2005 | Adams et al. |
| 6,930,728 B2 | 8/2005 | Rhee |
| 6,999,107 B2 | 2/2006 | Matoba et al. |
| 7,027,099 B2 | 4/2006 | Thompson et al. |
| 7,068,320 B2 * | 6/2006 | Tomizawa et al. ............ 348/448 |
| 7,084,846 B2 * | 8/2006 | Adachi et al. .................. 345/89 |
| 7,145,535 B2 * | 12/2006 | Takako et al. ................... 345/87 |
| 7,408,588 B2 * | 8/2008 | Tomizawa et al. ............ 348/448 |
| 7,916,213 B2 * | 3/2011 | Tomizawa et al. ............ 348/448 |
| 2001/0038369 A1 | 11/2001 | Adachi et al. |
| 2002/0054229 A1 | 5/2002 | Sasaki |
| 2004/0017343 A1 | 1/2004 | Adachi et al. |
| 2005/0052389 A1 | 3/2005 | Sawabe |

FOREIGN PATENT DOCUMENTS

| | | | |
|---|---|---|---|
| JP | 63-131788 | 6/1988 | |
| JP | 3-174186 | 7/1991 | |
| JP | 04-288589 | 10/1992 | |
| JP | 5-258184 | 10/1993 | |
| JP | 7-121143 | 5/1995 | |
| JP | 08-28864 | 3/1996 | |
| JP | 08-186812 | 7/1996 | |
| JP | 9-311320 | 12/1997 | |
| JP | 10-108218 | 4/1998 | |
| JP | 10-112845 | 4/1998 | |
| JP | 10-145817 | 5/1998 | |
| JP | 10-234009 | 9/1998 | |
| JP | 2000-115722 | 4/2000 | |
| JP | 2000-209571 | 7/2000 | |
| JP | 2000-330501 | 11/2000 | |
| JP | 2001-024987 | 1/2001 | |
| JP | 3121519 | 1/2001 | |
| JP | 2001-343956 | 12/2001 | |
| KR | 2001-0002659 | 1/2001 | |
| WO | WO 00/51355 | 8/2000 | |

OTHER PUBLICATIONS

U.S. Restriction Requirement dated Dec. 21, 2009.
U.S. Office Communication dated Oct. 6, 2010.
Korean Office Action issued on Sep. 15, 2005 and English translation thereof.
Japanese Office Action dated May 17, 2006 with an English translation.
Japanese Office Action dated Feb. 8, 2005 with an English translation.
U.S. Office Action dated Mar. 4, 2010.
U.S. Office Action dated Sep. 2, 2010.
U.S. Notice of Allowance dated Dec. 7, 2010.
U.S. Office Action dated Jun. 8, 2006.
U.S. Office Action dated Nov. 16, 2006.
U.S. Office Action dated Jan. 26, 2007.
U.S. Office Action dated Aug. 9, 2007.
U.S. Notice of Allowance dated Apr. 7, 2008.
U.S. Office Action dated Dec. 14, 2004.
U.S. Office Action dated Jul. 14, 2005.
U.S. Office Action dated Jan. 11, 2006.
U.S. Notice of Allowance dated Mar. 20, 2006.

* cited by examiner

● A LINE CONTAINING DATA IN INTERLACE SIGNALS

⊘ A LINE INTO WHICH DATA IS INTERPOLATED BY I/P CONVERSION

● A LINE CONTAINING DATA IN INTERLACE SIGNALS

○ A LINE INTO WHICH DATA OF A NEIGHBOURING LINE IS COPIED SO AS TO BE INTERPOLATED, IN I/P CONVERSION

IMAGE PROCESSING CIRCUIT, IMAGE DISPLAY DEVICE, AND AN IMAGE PROCESSING METHOD

PRIORITY INFORMATION

The present application is a divisional under 35 U.S.C. §§120/121 of U.S. application Ser. No. 11/723,021 filed on Mar. 15, 2007, now U.S. Pat. No. 7,916,213 which is a continuation of U.S. application Ser. No. 11/407,891 (now U.S. Pat. No. 7,408,588) filed Apr. 21, 2006, under 35 U.S.C. §120 which is a continuation under 35 U.S.C. §120 of U.S. application Ser. No. 10/128,946 filed Apr. 24, 2002 (now U.S. Pat. No. 7,068,320), which claims priority under 35 U.S.C. §119 to JP 2002-89845 filed Mar. 27, 2002 and JP 2001-133564 filed Apr. 27, 2001, the entire contents of each of which are hereby incorporated herein by reference.

FIELD OF THE INVENTION

The present invention relates to an image processing circuit, an image display device, and an image processing method, to which interlace image data is supplied so as to be subjected to image processing including time series comparison or spatial data comparison.

BACKGROUND OF THE INVENTION

Conventionally, image data supplied to an image display device is often subjected to various image processing steps before supplied to a display section, to improve the quality of the image displayed in the display section. The image processing steps as above are such as an image processing concerned with overshoot drive, white balance correction, color correction and so forth.

The overshoot drive is a driving method for improving the speed of the response of a culminatively responding liquid crystal panel. In the image processing concerned with the overshoot drive, a gradation value of the image data of the current field and that of the previous field are compared, and in accordance with the result thereof, a voltage applied to a liquid crystal pixel in the current field, i.e. the density of the image data of the current field is converted. In other words, the image processing concerned with the overshoot drive includes the comparison of the sets of image data of time series continuous fields.

The white balance correction is a step of the image processing in which sets of gradation data, R (red), G (green), and B (blue) are respectively adjusted in accordance with the transmittance of the liquid crystal panel. That is to say, in the liquid crystal panel, the balance of RGB luminance is lost due to wavelength dispersion when transmittance of the pixel is altered, and hence it is necessary to recover the balance by dint of the white balance correction. Moreover, since a color liquid crystal panel is arranged such that a single color pixel includes sub-pixels aligned therein and respectively matched with R, G, and B, the gradation values of these sub-pixels have to be compared with each other in the white balance correction. In other words, the white balance correction includes the data comparison of the spatially continuous sets of the data of pixels.

The color correction is a step of the image processing for avoiding a color, which is not supposed to be supplied, being displayed due to characteristics of the image display device. In the color correction, R, G, and B signals of each pixel are adjusted without disturbing white balance so as to be transmitted. In this step, it is again necessary to compare the gradation values between the aligned sub-pixels respectively matched with R, G, and B, and the data comparison between the spatially continuous pixels is also included. Moreover, the color correction may include the time series data comparison.

As illustrated above, the image processing includes the step which requires to subject the supplied image data to time series or spatial data comparison, and an image processing circuit which conducts the processing in time series manner is, for instance, arranged as illustrated in FIG. 16.

The image processing circuit as illustrated in FIG. 16 is arranged such that a set of supplied image data is split into two or more parts (two in the figure) and one part is directly supplied to an image processing section 101 whereas the other part is temporarily stored in a memory 102 and then supplied to the image processing section 101 after one field delay.

That is, in the above-mentioned image processing circuit, the part of the image data directly supplied to the image processing section 101 indicates the current field, meanwhile the part of image data supplied to the image processing section 101 via the memory 102 indicates the previous field. The image processing section 101 compares the supplied image data of the current field with that of the previous field, and as a result of this, the image data of the current field is converted so as to be supplied to a display section.

In the meantime, as image data to be supplied in the image display device, interlace image data (hereinafter, will be referred to as interlace signals) may be supplied. The interlace signals are arranged such that, as FIG. 17 shows, in each field image, signals containing data are supplied in every other scanning line, and moreover, a line containing data in the current field is vertically shifted to a next line in the subsequent field or the previous field.

However, when the above-identified image processing, which requires the time series data comparison, is conducted in the image processing circuit to which the interlace signals are supplied, as FIG. 17 illustrates, lines in two consecutive fields (previous field and current field), which respectively contain a set of image data to be compared, are mismatched.

That is to say, to compare signals in a line N of the current field with signals of the previous field, basically the target of comparison should be signals in a line N of the previous field. However, the interlace signals are arranged such that a line containing data in a field vertically shifts to the next line in the consecutive field so that when data exists in the line N of the current field, there is no data in the line N of the previous field.

Thus in the image processing circuit to which the interlace signals are supplied, it is impossible to compare the sets of the data in the same lines, so that the data comparison is conducted between (a) a line and (b) another line which is immediately above or below the line to be compared. As a result, this could cause significant degradation of the quality of the image and in some cases a breakdown of the image processing.

Moreover, in the case of spatial data comparison in the image processing circuit, image processing devices of late are required to produce vivid and high-definition image so that it has been attempted to exploit the full potential of the device.

A device such as CRT (Cathode-Ray Tube), which is high-contrast and does not involve the change of the color in accordance with the gradation, can obtain the image with higher definition by improving the signal precision (for instance, to 8 bit). In the meantime, a device such as LCD (Liquid Crystal Display) which has relatively poor color reproductivity could lose the balance of whole image, when color of a pixel is modified without considering harmony with surrounding pixels.

Thus, to avoid this happens, it is necessary to modify the image in consideration with the balance by comparing colors between neighboring pixels (including pixels on neighboring scanning lines), in the image processing including the spatial data comparison such as the white balance correction and the color correction.

However, in this case, when the image data supplied to the image processing device is interlace signals, the data comparison between the neighboring lines could have a problem such that apart of the image data to be compared does not exist in the same field, and hence the precision of the image processing could be deteriorated.

SUMMARY OF THE INVENTION

To solve the above-identified problems, an object of the present invention is to provide an image processing circuit, an image display device, and an image processing method which are capable of improving the precision of the image processing which includes comparison in time series or spatial manner, the image processing being conducted with respect to image data supplied in an interlace manner.

For this purpose, an image processing circuit of a first arrangement in accordance with the present invention, to which interlace image data is supplied and in which the image data is subjected to image processing including time series comparison or spatial data comparison, includes: I/P conversion means for converting the interlace image data, which has been supplied, to progressive image data; and image processing means for subjecting the image data, which has been subjected to conversion to the progressive data by the I/P conversion means, to image processing, wherein the I/P conversion means creates new data, in each field of the interlace image data, which is used for interpolation so that the number of fields of whole image data does not vary during converting the interlace image data to the progressive image data, and a line to be interpolated by I/P conversion receives data in accordance with calculation using data of at least one line located before and after the line to be interpolated in a sub-scanning direction. According to this arrangement, when image data supplied in an interlace manner is subjected to image processing, the interlace image data is converted to progressive image data by the I/P conversion means, before the image processing by the image processing means. In other words, the image processing means subjects progressive image data to the image processing.

If the image processing in the image processing means includes time series data comparison, it is not necessary to compare data between a line in a field and a different line in the consecutive field, as in the case of conducting image processing using interlace signals. Thus it is possible to avoid the deterioration of the image due to the comparison of the sets of the data of different lines.

Moreover, if the image processing in the image processing means includes spatial data comparison and also image data which has been supplied is interlace signals, a part of image data to be compared might not exist in the same field when comparing sets of the data of neighboring lines. In this case the precision of the image processing is low.

In the meantime, in the case of the image processing including spatial data comparison, the arrangement in accordance with the present invention makes it possible to conduct the image processing using progressive signals in which all lines are filled with data, by providing the I/P conversion means in a stage before the image processing means. On this account, it is possible to improve the precision of the image processing.

The simplest methods of the I/P conversion are such as a method in which interlace signals of a field is superposed on interlace signals of a consecutive field to create progressive signals of one field and a method in which lines without data in interlace signals are interpolated with a simple copy of data in lines directly before or after the lines to be interpolated.

However, in these methods, existing data of initially supplied interlace signals is adopted so that no data is newly created in the I/P conversion. Thus the improvement of the precision of the image processing is not or hardly achieved.

Thus, the above-identified I/P conversion means creates new data, in each field of the interlace image data, which is used for interpolation so that the number of fields of whole image data does not vary during converting the interlace image data to the progressive image data, and a line to be interpolated by I/P conversion receives data in accordance with calculation using data of at least one line located before and after the line to be interpolated in a sub-scanning direction. So this makes it possible to improve the precision of the image processing with certainty.

To solve the above-identified problems, an image processing circuit of a second arrangement in accordance with the present invention, to which interlace image data is supplied and in which the supplied image data is subjected to image processing, includes: I/P conversion means for converting the interlace image data, which has been supplied, to progressive image data; and image processing means for subjecting the image data, which has been subjected to conversion to the progressive data by the I/P conversion means, to image processing in relation to overshoot drive.

According to this arrangement, when image data, which is supplied in an interlace manner, is subjected to the image processing related to the overshoot drive, by the I/P conversion means, interlace image data is converted to progressive image data before the image processing in the image processing means. In other words, the image processing means subjects the progressive image data to image processing.

The image processing relating to overshoot drive includes time series data comparison so that by subjecting the progressive image data to the image processing, it is not necessary to compare data between a line in a field and a different line in the consecutive field, as in the case of conducting the image processing using interlace signals. Thus it is possible to avoid the deterioration of the image due to the comparison of sets of the data of different lines. To solve the above-identified problems, an image processing circuit of a third arrangement in accordance with the present invention, to which interlace image data is supplied and in which the supplied image data is subjected to image processing, includes: I/P conversion means for converting the interlace image data, which has been supplied, to progressive image data; and image processing means for subjecting the image data, which has been subjected to conversion to the progressive data by the I/P conversion means, to color correction as image processing, in the color correction correcting device characteristics of display means for displaying image.

According to this arrangement, when image data to be supplied in an interlace manner is subjected to the color correction, by the I/P conversion means, interlace image data is converted to progressive image data before the image processing in the image processing means. In other words, the image processing means subjects the progressive image data to the image processing.

The color correction correcting device characteristics of the display means is mainly spatial data comparison. Thus if the image data which has been supplied is interlace signals, apart of the image data to be compared does not exist in the same field when comparing sets of the data of neighboring lines. So this causes the deterioration of the precision of the image processing.

In the meantime, when the progressive image data is subjected to the image processing, since all lines are filled with data, it is possible to improve the precision of the image processing.

The color correction may include time series data comparison, so in such a case it is possible to avoid the deterioration of the image by comparing sets of the data of different lines.

To solve the above-identified problems, an image processing circuit of a fourth arrangement in accordance with the present invention, to which interlace image data is supplied and in which the supplied image data is subjected to image processing, includes: I/P conversion means for converting the interlace image data, which has been supplied, to progressive image data; and image processing means for subjecting the image data, which has been subjected to conversion to the progressive data by the I/P conversion means, to white balance correction as image processing.

According to this arrangement, when image data supplied in an interlace manner is subjected to the white balance correction, by the I/P conversion means, interlace image data is converted to progressive image data, before the image processing in the image processing means. In other words, the image processing means subjects the progressive image data to image processing.

The white balance correction includes spatial data comparison. Thus if the image data which has been supplied is interlace signals, a part of image data to be compared does not exist in the same field when comparing the sets of the data of neighboring lines. So this causes deterioration of precision of the image processing.

In the meantime, when progressive image data is subjected to image processing, since all lines are filled with data, it is possible to improve the precision of the image processing.

For a fuller understanding of the nature and advantages of the invention, reference should be made to the ensuing detailed description taken in conjunction with the accompanying drawings.

DESCRIPTION OF THE EMBODIMENT

The following description will discuss an embodiment in accordance with the present invention in reference to FIGS. 1 to 15 and FIGS. 18 to 21.

In the present embodiment, an explanation is given in reference to an example in which an overshoot drive is conducted in a liquid crystal display device including a TFT (Thin Film Transistor) liquid crystal panel.

Figure 2:
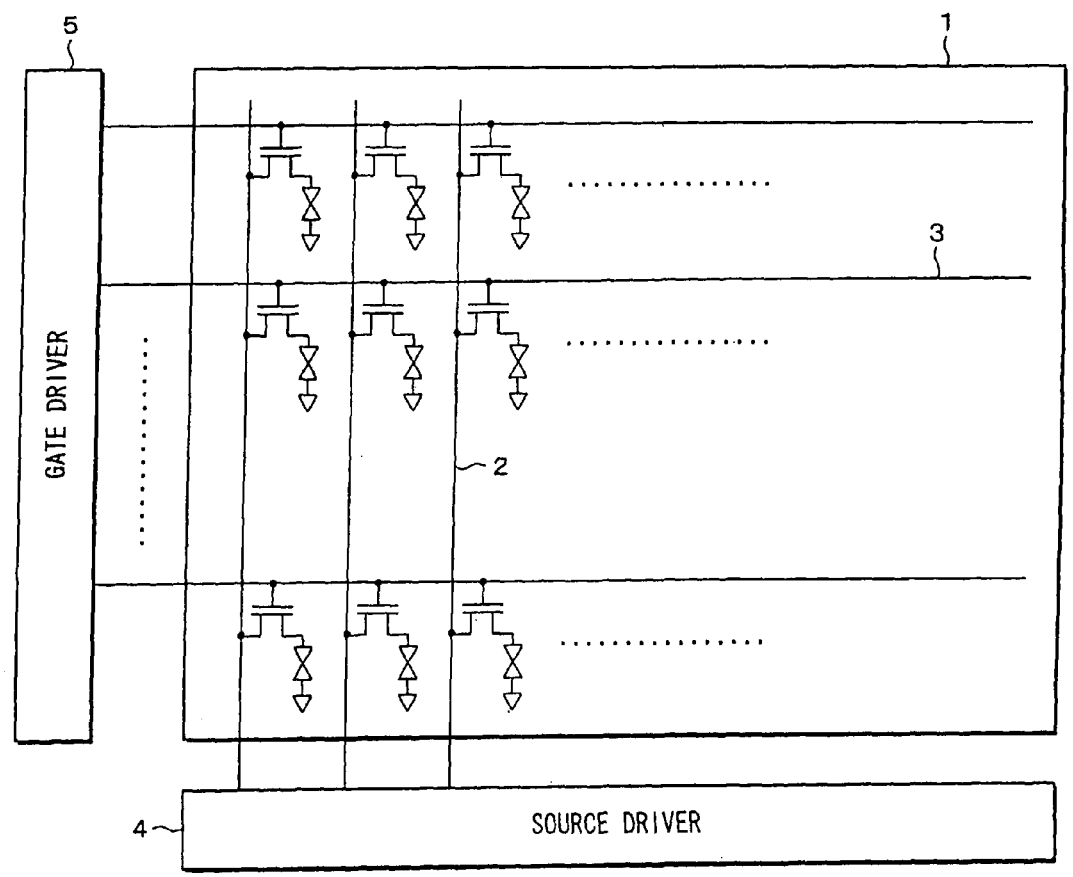
FIG. 2 is an explanatory drawing, briefly illustrating an arrangement of a liquid crystal display panel of an image display device.

As illustrated in FIG. 2, a TFT liquid crystal panel 1 includes: a plurality of source bus line 2 which are aligned as parallel rows being vertical with respect to the display; and a plurality of scanning line 3 which are orthogonal to the source bus lines 2 and aligned as parallel rows being horizontal with respect to the display.

In the TFT liquid crystal panel 1, in accordance with the intersection of the source bass line and the scanning line, a pixel 7 (see FIG. 3) is further provided via a TFT 6 (see FIG. 3) which is a switching element. The source bus lines 2 are connected to a source driver 4 at the end of the panel, meanwhile the scanning lines 3 are connected to a gate driver 5 at the end of the panel.

For the TFT crystal liquid panel 1 produces a display, scanning signals are successively supplied from the gate driver 5 on a line-by-line basis, so that this successively turns on TFTs 6 respectively connected to each scanning line 3 on a line-by-line basis, and in the source driver 4, a gradation voltage in accordance with gradation data is written in each pixel 7 matched with each scanning line 3.

Figure 3:
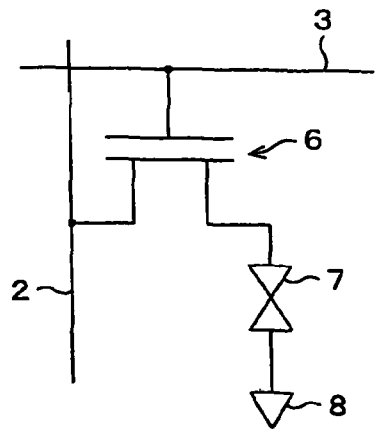
FIG. 3 is a schematic circuit diagram, illustrating an arrangement of pixels in the liquid crystal display panel.

A structure of the pixel 7 is briefly illustrated in FIG. 3. When the TFT 6 is turned on (gate on), the data gradation voltage applied to a source electrode of the TFT 6 is applied to an electrode (pixel electrode), which is one of two electrodes composing the pixel 7, via a drain electrode of the TFT 6. The other electrode composing the pixel 7 is a common electrode 8 shared by all pixels. Liquid crystal responds to a voltage applied to the pixel 7 so as to be adjusted to have desired luminance.

Liquid crystal molecules in each pixel 7 change: the direction thereof in alignment with the longitudinal axis (director) due to dielectric anisotropy of the molecules when the voltage is applied; and the direction of polarization of the light passing through the liquid crystal due to the optical anisotropy of the molecules. On this account, an amount of the light passing through the liquid crystal is controlled and the gradation of the light is adjusted. In this case a voltage value applied to each pixel is predetermined in each level of the gradation, and in each pixel in the liquid crystal panel 1, a voltage in a desired level of the gradation is applied to each frame via the TFT 6 so that an image is displayed.

Electric charge applied to each pixel 7 is holden even after the TFT 6 being turned off. In other words, the electric charges applied when the gradation voltage is applied are holden until the gradation voltage is applied again in the next frame.

However, although the electric charge is holden in each pixel 7, a voltage, which is applied in the process of changing gradation luminance, is changed due to the change of the liquid crystal permittivity. That is to say, in the case of changing the gradation luminance, the director of the liquid crystal molecules is at first oriented to the direction for displaying the gradation luminance of the previous frame. When a voltage matched with new gradation data is applied to the liquid crystal molecules, the molecules change the direction due to the dielectric anisotropy and this causes the change of the optical characteristics, and as a result the gradation luminance is changed.

In the case of nematic liquid crystal, although the response speed of the liquid crystal molecules varies in accordance with a mode of display, the speed falls within the range of several ms to several tens of ms, and hence the response is continued even after the TFT 6 is turned off. As the liquid crystal molecules change the direction due to the dielectric anisotropy, permittivity of the liquid crystal is inevitably changed so that a capacity between the electrodes is changed.

When the permittivity of the liquid crystal molecules located between the electrodes is changed due to the change of the direction of the molecules, a voltage value determined by the charged electric charge is changed within one frame. That is, although the liquid crystal molecules have characteristics to respond within one frame, if a normal gradation voltage is applied on the occasion of the change of gradation, the voltage is changed within one frame. Thus it is not possible to obtain desired gradation luminance and after all periodicity around three frames is necessary. This change of the voltage due to the change of the permittivity can be adjusted by using a drive to apply a voltage which factors in a variation of the permittivity of the liquid crystal, i.e. an overshoot drive.

An appropriate voltage value to be applied at the moment of the change of the gradation is made to be a gradation voltage, which is required to be displayed by the liquid crystal after the response, only by adding a voltage achieving a capacity ratio of each gradation to the voltage value (in practice the voltage value varies in accordance with the speed of the response of the liquid crystal, etc.).

Following is an example for a simple explanation of the overshoot drive, in which liquid crystal molecules hardly respond in the state of gate on, and the molecules finish the response within one frame.

When there are 256 gradations, gradation voltages respectively matched with gradation $0, 1, 2, \ldots, n, \ldots, m, \ldots, 255$ are set as $V_0, V_1, V_2, \ldots, V_n, \ldots V_m, \ldots, V_{255}$. Also, capacities between the electrodes of the pixel 7, which are respectively matched with the gradations are set as $C_0, C_1, C_2, \ldots, C_n, \ldots, C_m, \ldots, C_{255}$.

Provided that a pixel displays an image with n gradation, a voltage between the electrodes is $V_n$ and a capacity between the electrodes is $C_n$. If an image with m gradation is to be displayed in the following frame, electric charges Q required to be charged are:

$$Q = C_m V_m \qquad (1)$$

However, in this case since the TFT 6 is turned off before the capacity is changed from $C_n$ to $C_m$, electric charges Q' actually charged when a voltage $V_m$ is applied is:

$$Q' = C_n V_m \qquad (2)$$

(Provided that the liquid crystal molecules hardly respond in the state of gate on.)

That is, after the display of the gradation n, a voltage V' necessarily applied to the pixel 7 for charging the electric charges Q which are required to display the gradation m is, since a following equation $$Q = C_n V' = C_n (C_m / C_n V_m) \qquad (3)$$

holds, expressed by an equation as below.

$$V' = C_m / C_n V_m \qquad (4)$$

Application of this voltage V' makes it possible to obtain desired gradation within one frame in any type of gradation change, and hence the overshoot drive is of great utility for improving the imaging speed of the liquid crystal.

Moreover, according to the equation (4), it is realized that the comparison between the gradation data of the current field and that of the previous field is necessary to acquire the voltage V'. As an arrangement of a comparator conducting the comparison above, there are three types: an arrangement using a look-up table; an arrangement using a processing circuit; and a mixture of these two. The image data compared in the comparator may be signals indicated in R (red), G (green), B (blue) color system, or signals indicated in Y (luminance) or C (chromaticity).

Figure 1:
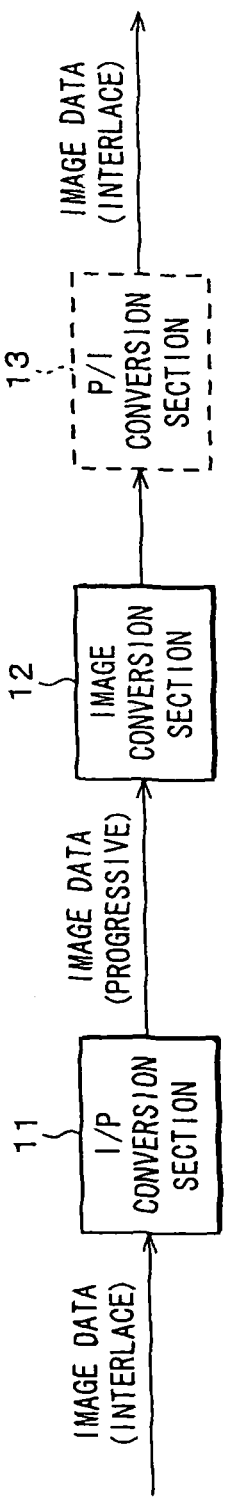
FIG. 1 illustrates an embodiment of the present invention, and is a block diagram briefly showing an arrangement of an image processing circuit.

Now, an arrangement of the image processing circuit in accordance with the present embodiment is illustrated in FIG. 1. The image processing circuit, which receives image data in the form of interlace signals and subjects the image data to the image processing, includes an I/P (interlace/progressive) conversion section (I/P conversion means) 11 and an image processing section (image processing means) 12. The device may include a P/I (progressive/interlace) conversion section 13, if necessary.

Figure 4:
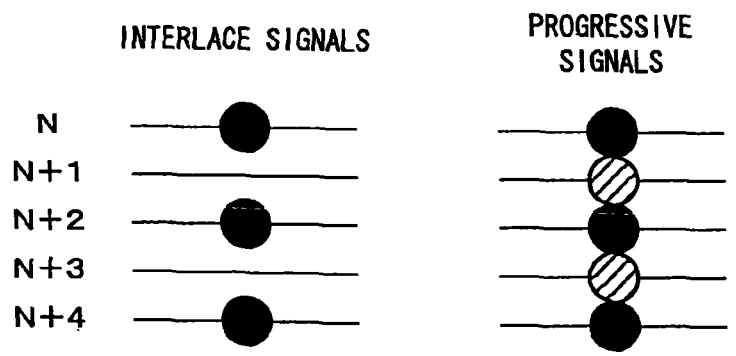
FIG. 4 is an explanatory drawing, illustrating I/P conversion process in the image processing circuit.

In the image processing circuit, the supplied interlace signals are converted to progressive signals in the I/P conversion section 11 before being subjected to the image processing in the image processing section 12. The I/P conversion conducted here is, as FIG. 4 illustrates, a process to interpolate data into lines of the interlace signals in which lines data does not exist so as to convert the signals to the progressive signals in which all lines are filled with data.

The image processing section 12 to which the progressive signals are supplied makes it possible to avoid the degradation of the image, which is resulting from the data comparison between a line in a field and a different line in the consecutive field such as in the case that image processing is conducted using the interlace signals, when image processing including time series data comparison is conducted. This will be explained as below in reference to FIG. 5.

Figure 5:
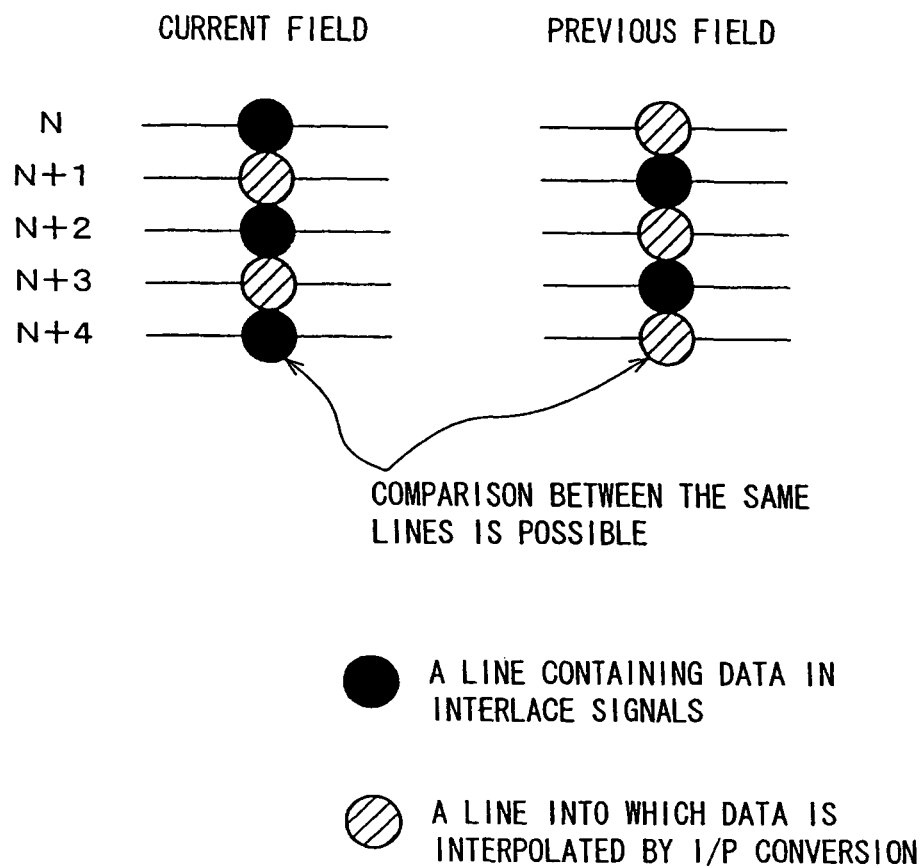
FIG. 5 is an explanatory drawing, illustrating time series data comparison by a progressive signal.

That is, in two consecutive fields (current field and previous field), when the interlace signals in the current field contain data in lines N, N+2, and N+4, no data is contained in lines N+1 and N+3. Meanwhile, the interlace signals in the previous field contain data in the lines N+1 and N+3 whereas no data is contained in the lines N, N+2, and N+4. On this account it is not possible to compare data between a line in the current field and the same line in the previous field. However, the progressive signals are, as FIG. 5 illustrates, interpolated so that all lines thereof in both of the previous field and the current field contain data, and hence it is possible to compare the sets of the data in the same lines.

Moreover, in the image processing section 12, even when the image processing including spatial data comparison is conducted, it is possible to conduct the image processing using a greater amount of data due to the data interpolation in the I/P conversion, and thus the precision of the image processing is improved.

However, there are various methods of the I/P conversion, and not all of these methods are effective in the I/P conversion conducted in the I/P conversion section 11.

Figure 6:
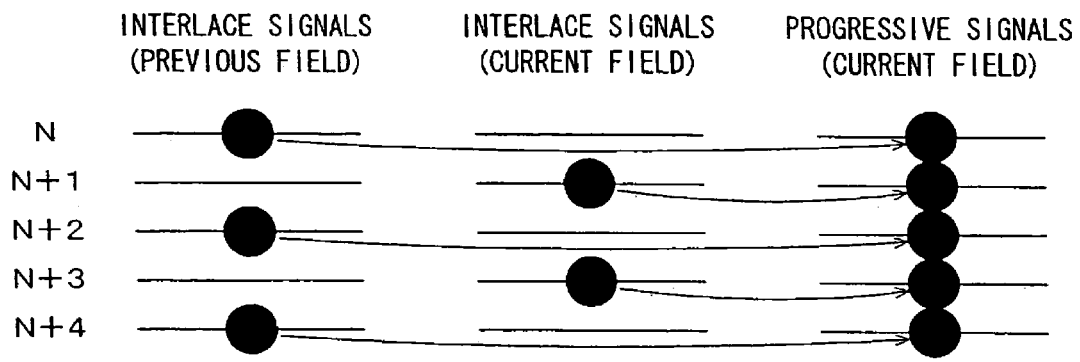
FIG. 6 is an explanatory drawing, indicating an example of unfavorable I/P conversion in the image processing circuit.
Figure 7:
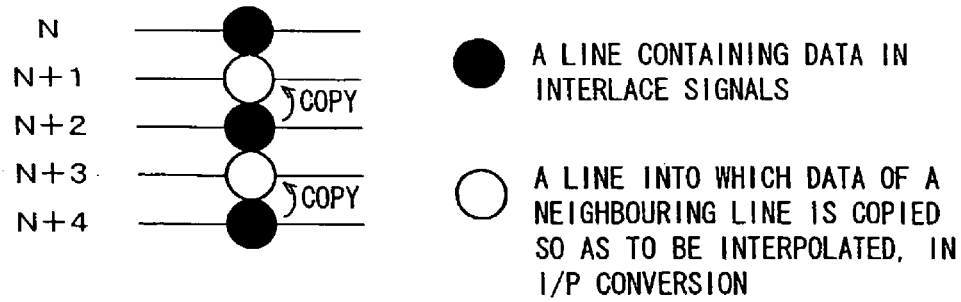
FIG. 7 is an explanatory drawing, illustrating another example of unfavorable I/P conversion in the image processing circuit.

For instance, the simplest methods of the I/P conversion are such as a method in which the interlace signals of a field is superposed on the interlace signals of the consecutive field to create the progressive signals of one field as illustrated in FIG. 6 and a method in which lines without data in the interlace signals are interpolated with a simple copy of data in lines directly before or after the lines to be interpolated, as illustrated in FIG. 7. However, in these methods, existing data of the initially supplied interlace signals is adopted so that no data is newly created in the I/P conversion.

When the methods shown in FIGS. 6 and 7 are adopted as the image processing conducted in the I/P conversion section 11, the improvement of the precision of the image processing is not or hardly achieved. The reasons of this will be explained below.

When the method shown in FIG. 6 is adopted in the I/P conversion section 11, it is possible to compare data between the same lines in the progressive signals of consecutive two fields, in the image processing section 12. However, the sets of the data to be compared are equivalent to sets of the data which are two fields apart from each other in pre-conversion interlace signals. In other words, in this case the comparison is made between the sets of the data temporally apart from each other so that this could cause the image degradation.

Figure 17:
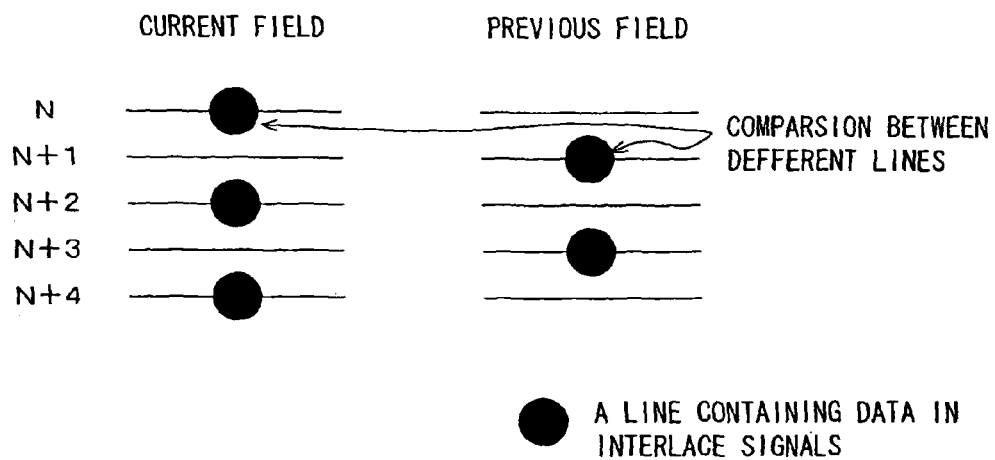
FIG. 17 is an explanatory drawing, indicating time series data comparison by interlace signals.

In the meantime, when the method illustrated in FIG. 7 is adopted in the I/P conversion section 11, in the image processing section 12, apparently the sets of the data in the progressive signals of the two fields are compared with each other in the same lines. However, in reality one of the two sets of the data to be compared in the image processing section 12 is interpolated data composed such that with respect to the line in the interlace signals, which line do not contain data, data of the lines before and after the line to be interpolated is copied so as to be pasted with respect to the line to be interpolated. Thus in the current and previous fields, as in the case shown in FIG. 17, data of a line is substantially compared with that of the line before and after the line to be interpolated, and this could cause the image degradation.

Therefore, the I/P conversion section 11 in accordance with the present embodiment is arranged such that the I/P conversion to be applied does not change the number of fields on the occasion of the conversion of the interlace signals to the progressive signals, by creating new data in each field of the interlace signals and using the created data for the interpolation. Moreover, a line to be interpolated with data by the I/P conversion spatially receives data thanks to a calculation using data of the line before or after the line to be interpolated (may be more than one line) in the sub-scanning direction.

Incidentally, in the case of the data in fields, which is indicated as interlace signals, lines containing or not containing data are the lines oriented to the main scanning direction, i.e. the scanning lines, so that as for a line interpolated with data by the spatial I/P conversion, the interpolation data is calculated using data of the line before or after the line to be interpolated in the sub-scanning direction.

Figure 18:
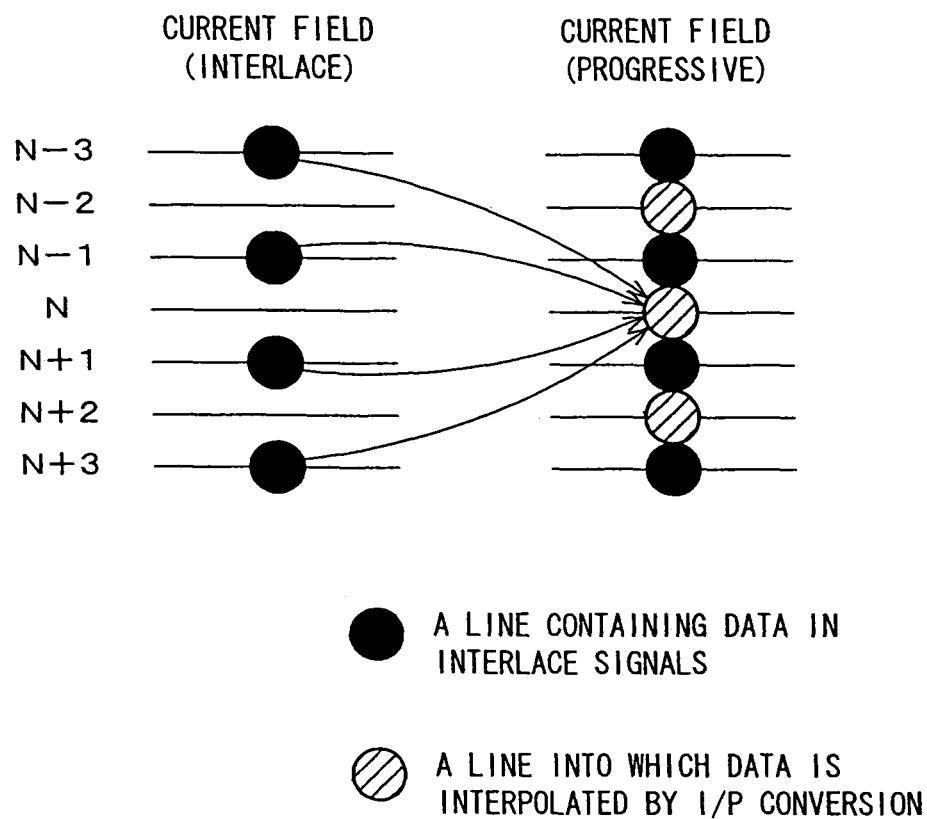
FIG. 18 is an explanatory drawing, illustrating an example of reference data of lines which are operated in the I/P conversion in the image processing circuit.

An example illustrated in FIG. 18 shows that, to interpolate data into a line N of the current field, the interpolation data is calculated using data of two lines before and after the line to be interpolated (i.e. data of lines N−3, N−1, N+1, and N+3) in the image data of the interlace signals not being subjected to the I/P conversion.

It is noted that the present invention is not limited to the descriptions above, and hence the number of lines used for the calculation of the data interpolation is not particularly limited, as long as data of more than one line before and after a line to be interpolated is used. Also, the number of lines used for the calculation of the data interpolation is not necessarily the same before the line to be interpolated and after the same.

Moreover, in the I/P conversion section 11, it is possible to conduct more precise I/P conversion with movement compensation, by storing data of a field before the current field in a memory (in some methods, data of a couple of previous fields is stored) and comparing data between a plurality of time series continuous fields. Of course, it is possible to conduct the I/P conversion only by spatial comparison (data comparison in the same field) without using the memory.

Figure 19:
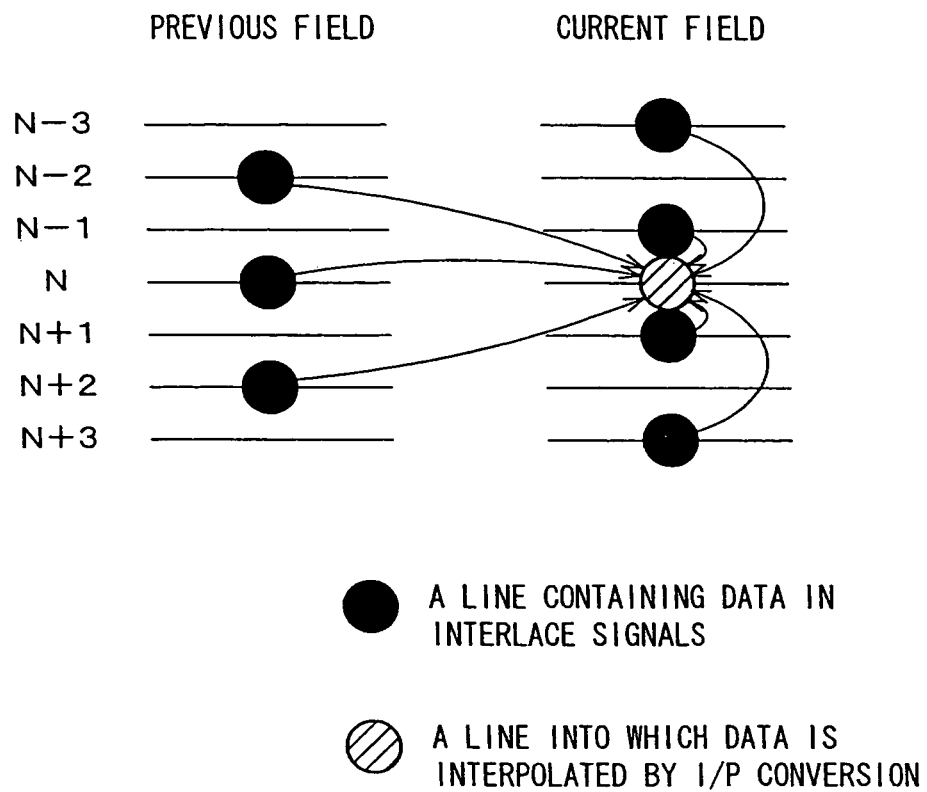
FIG. 19 is an explanatory drawing, illustrating another example of reference data of lines which are operated in the I/P conversion in the image processing circuit.
Figure 20:
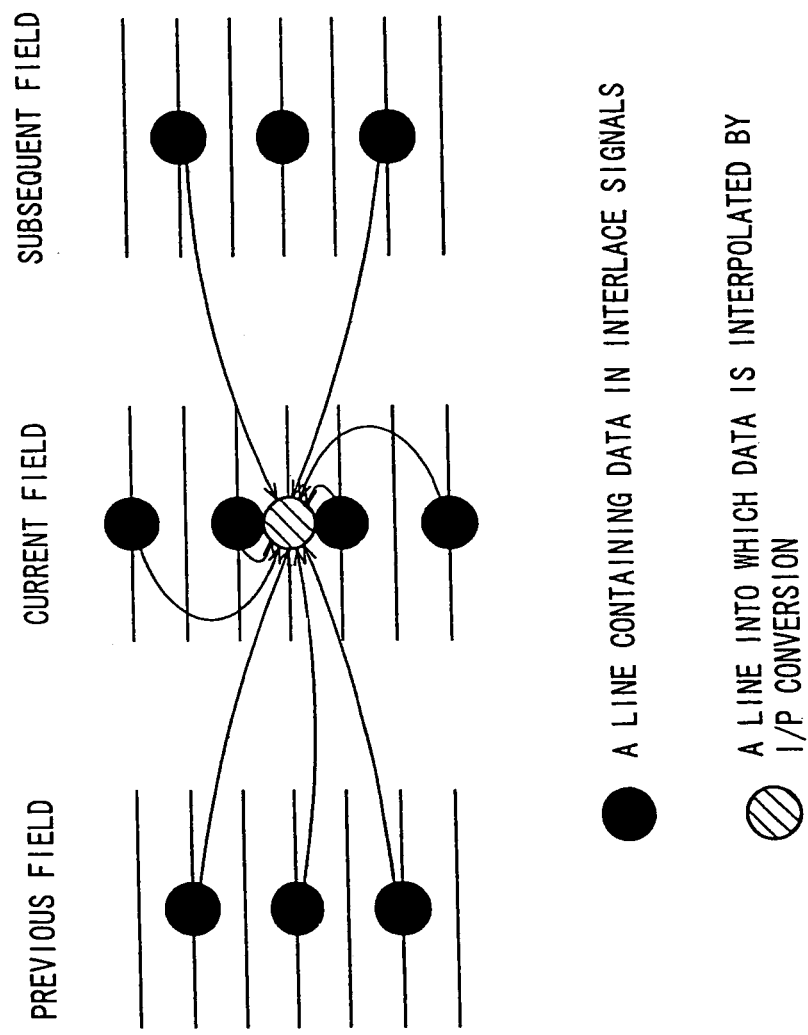
FIG. 20 is an explanatory drawing, illustrating a further example of reference data of lines which are operated in the I/P conversion in the image processing circuit.

What is illustrated in FIGS. 19 and 20 is a concrete example of a case that more precise I/P conversion with the movement compensation is conducted in the I/P conversion section 11 by conducting the data comparison between several time series continuous fields, in addition to the spatial data comparison illustrated in FIG. 18.

In the example shown in FIG. 19, to interpolate data into a line N of the current field, the interpolation data is calculated using: data of lines N−3, N−1, N+1, and N+3 of the image data in the interlace signals in the current field, the signals not being subjected to I/P conversion yet; and data of lines N−2, N, and N+2 in the previous field.

In this example, data of the previous field for the time series comparison as well as data of the current field for the spatial data comparison are used for the data interpolation on the occasion of the I/P conversion. However, as illustrated in FIG. 20, data of the subsequent field may be additionally used for the time series data comparison.

An example shown in FIG. 20 is arranged such that, for interpolating data into a line N of the current field, the interpolation data is calculated using: data of lines N−3, N−1, N+1, and N+3 of image data in the interlace signals in the current field, the signals not being subjected to the I/P conversion yet; data of lines N−2, N, and N+2 in the previous field; and data of lines N−2 and N+2 in the subsequent field.

As described above, it is not necessary to use data of both the fields before and after the current field to be interpolated, when the I/P conversion with the movement compensation is conducted by dint of the data comparison between several time series continuous fields. That is, as FIG. 19 illustrates, it is possible to conduct the time series I/P conversion only with the data comparison between the fields before and after the field to be interpolated.

Moreover, in the examples illustrated in FIGS. 19 and 20, data of one field before the current field and one field after the same, provided in time series order are used for the interpolation in the current field. However, the present invention is not limited to this so that it is possible to use more than one field before the current field and more than one field after the current field in time series order.

Furthermore, for calculating interpolation data: data of the lines in sub-scanning direction, which are respectively before and after the line to be interpolated; and the data of the fields arranged in time series order, which are respectively before and after the field including a line to be interpolated. However, in actual calculation it is possible to thin out the sets of the data. For instance, as illustrated in FIG. 20, for calculating interpolation into a line N in the current field, while the data of lines N−2 and N+2 in the subsequent field is used, the data of a line N in the subsequent field is thinned out.

The image processing section 12 subjects data to the image processing and then outputs the data as the progressive signals. The progressive signals can be directly supplied to the image display device, if the device can produce an image by receiving the signals.

However, generally now-available controllers of the image display device only support the interlace signals, so in this case the progressive signals supplied from the image processing section 12 are again converted to interlace signals in the P/I conversion section 13 and then sent to the image display device.

Next, referring to FIG. 8, a concrete example of the image processing circuit will be illustrated as below. An image processing circuit shown in FIG. 8 includes: a first I/P conversion section (current field I/P conversion section) 21; a second I/P conversion section (previous field I/P conversion section) 22; and the image processing section 12. If necessary, the circuit may further include the P/I conversion section 13.

The first I/P conversion section 21 and the second I/P conversion section 22 subject interlace signals, supplied as image data, to I/P conversion so that the signals are converted to the progressive signals and then transmitted. The first I/P conversion section 21 subjects interlace signals in the current field to the I/P conversion, meanwhile the second I/P conversion section 22 subjects the interlace signals in the previous field to the I/P conversion.

Here, for supplying the interlace signals in the previous field to the second I/P conversion section 22, a field memory (unillustrated) is provided in a stage before the second I/P conversion section 22. A set of the image data supplied to the image processing circuit is initially split into two parts. One of the parts is directly supplied to the first I/P conversion section 21 so as to become the image data of the current field, whereas the other part is temporarily stored in a memory in the step before the second I/P conversion section 22, and then becomes the image data of the previous field after one field delay.

Figure 8:
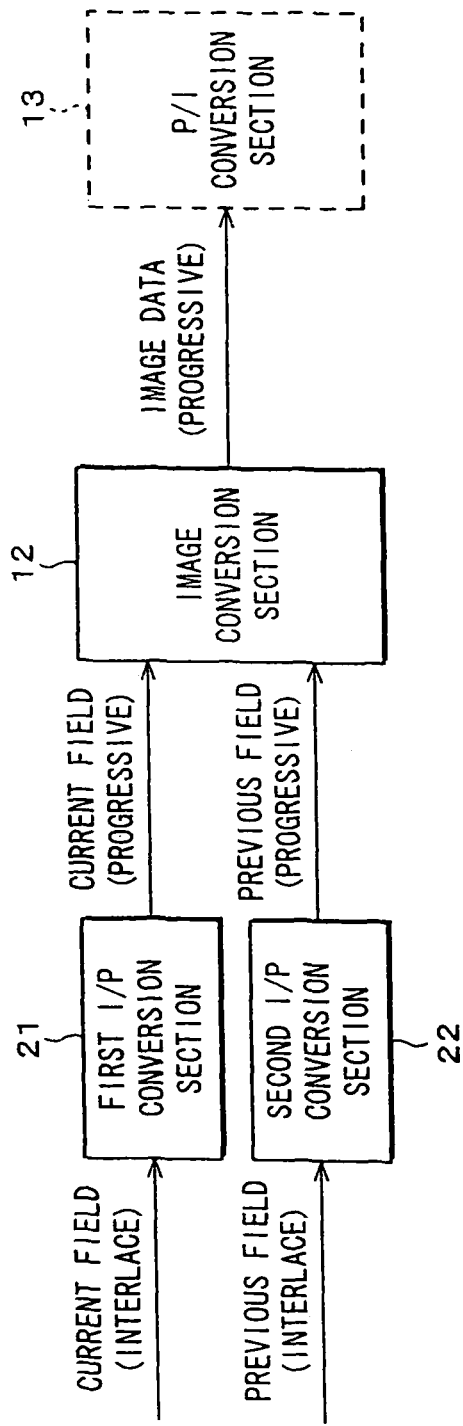
FIG. 8 is a block diagram, illustrating an example of an arrangement of the image processing circuit.

Moreover, in the image processing circuit illustrated in FIG. 8, the first I/P conversion section 21 and the second I/P conversion section 22 respectively subject the image data of the current field and the image data of the previous field to the I/P conversion. Thus it is possible to adopt different methods of the I/P conversion respectively in the first and second I/P conversion sections 21 and 22.

As described above, the methods of the I/P conversion are divided into methods using a memory (methods in which time series comparison is conducted) and methods not using a memory (methods in which the time series comparison is not conducted). Thus in the above-mentioned image processing circuit, there are four types of arrangements as follows, which are classified with regard to the use of the memory in the first and second I/P conversion sections 21 and 22.

An arrangement in which a method not using the memory is adopted in both the first and second I/P conversion sections 21 and 22.

An arrangement in which a method using the memory is adopted in both the first and second I/P conversion sections 21 and 22.

An arrangement in which the method using the memory is adopted in the first I/P conversion section 21, whereas the method not using the memory is adopted in the second I/P conversion section 22.

An arrangement in which the method not using the memory is adopted in the first I/P conversion section 21, whereas the method using the memory is adopted in the second I/P conversion section 22.

The arrangement can expect the cost reduction of the circuit since the memory is used neither in the first I/P conversion section 21 nor the second I/P conversion section 22. However, the precision of the I/P conversion in both the first and second I/P conversion sections 21 and 22 is low so that the quality of the image after the image processing in the image processing section 12 is the lowest among the arrangements.

In the meantime, in the arrangement, the first and second I/P conversion sections 21 and 22 perform the I/P conversion more precisely, and hence the quality of the image after the image processing in the image processing section 12 is the highest among the arrangements. However, using the memory in both the first and second I/P conversion sections 21 and 22 causes the rise of the costs of the circuit.

In the arrangements and, the memory is used in either one of the first and second I/P conversion sections 21 and 22. So, when the image processing section 12 is provided particularly for the image processing in accordance with the overshoot drive, the data comparison in the image processing section 12 is conducted mainly using data of the current field, so that the arrangements are highly effective if the data of the current field is reliable.

Thus, for effectively improving the quality of the image with relatively cheap costs, the most preferable arrangement for an overshoot drive circuit is the arrangement in which precise I/P conversion using the memory is conducted in the first I/P conversion section 21 for the current field, whereas the memory is omitted for cost reduction in the second I/P conversion section 22 for the previous field.

Meanwhile, despite the arrangement is similar to the arrangement in terms of the scale (similar cost performance), the arrangement does not improve the quality of the image so much when adopted in the overshoot drive circuit.

Figure 9:
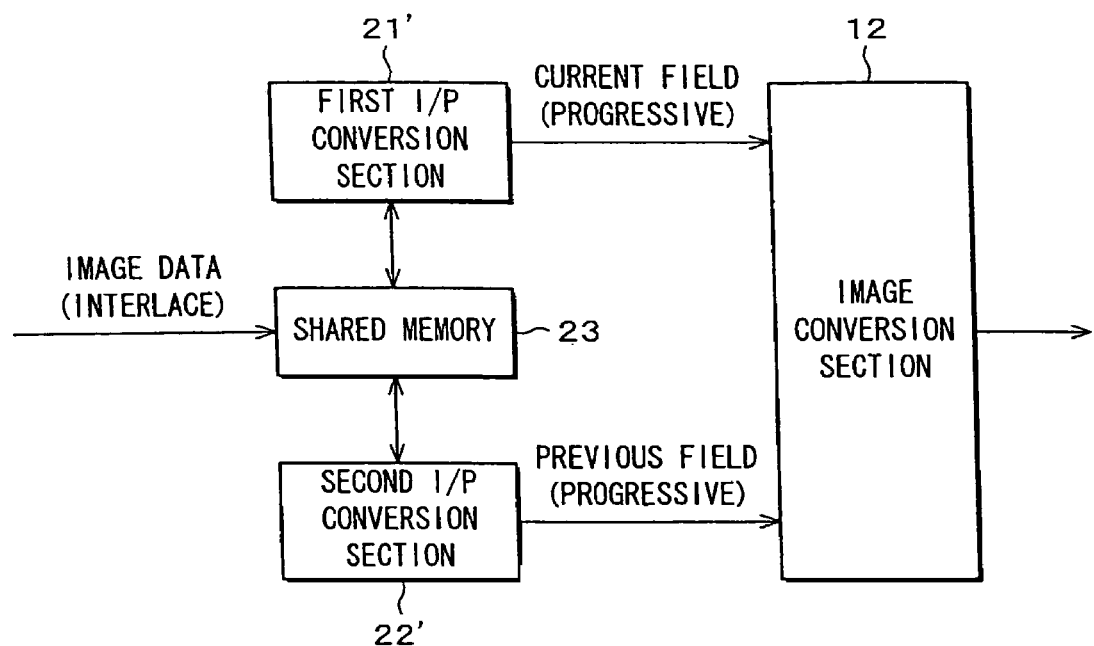
FIG. 9 is a block diagram, illustrating another example of an arrangement of the image processing circuit.

As described above, although the quality of the image is most improved by the arrangement in which the memory is used in both the first and second I/P conversion sections 21 and 22, the addition of the memory causes the rise of the costs. Thus it is also possible to reduce the costs by using the memory in both the first and second I/P conversion sections 21 and 22 for maximizing the improvement of the quality of the image at the same time sharing the memory between the first and second I/P conversion sections 21 and 22. Referring to FIG. 9, the image processing circuit arranged as such is illustrated below.

The image processing circuit shown in FIG. 9 is arranged such that both of a first I/P conversion section (current field I/P conversion section) 21' and a second I/P conversion section (previous field I/P conversion section) 22' conduct the I/P conversion using the image data of more than one field stored in a memory. The image data of the more than one field, which is used for the above-mentioned I/P conversion, is stored in a shared memory (memory for I/P conversion) 23.

Figure 10:
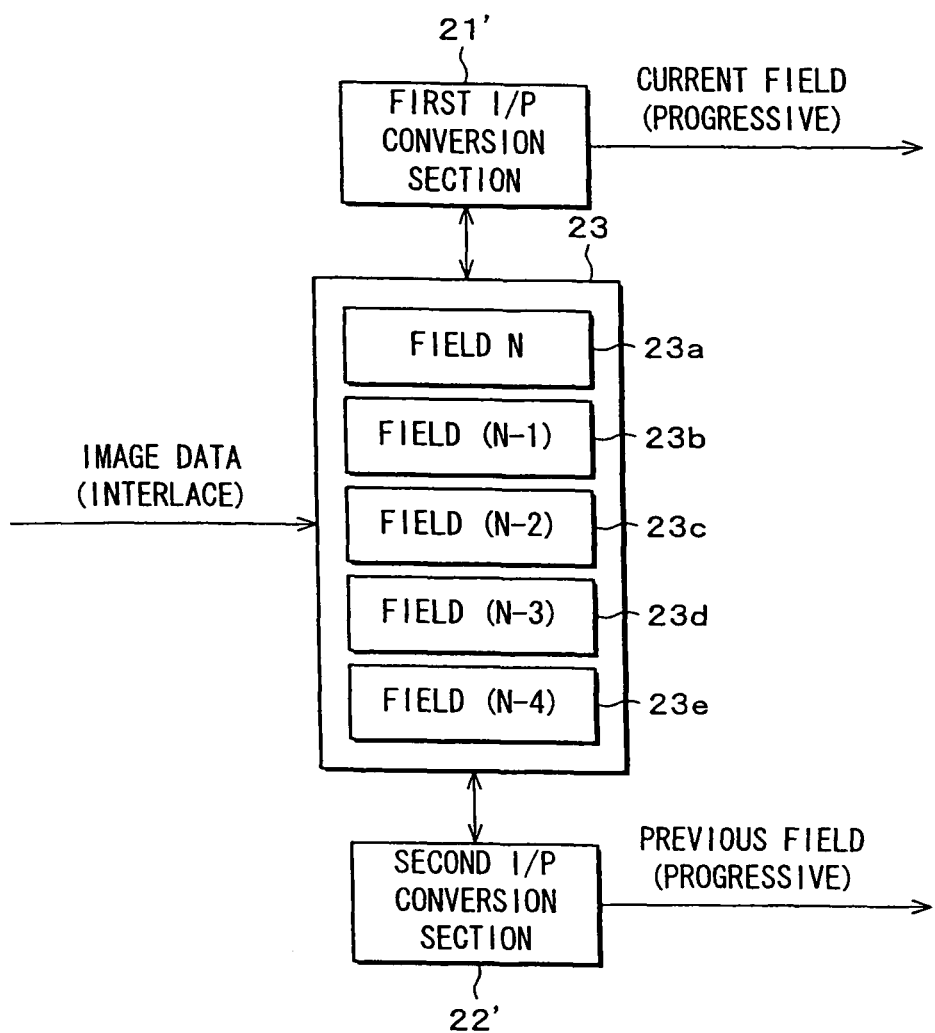
FIG. 10 is a block diagram, illustrating an example of a concrete arrangement of the image processing circuit in FIG. 9.

Referring to FIG. 10, the I/P conversion conducted using the first and second I/P conversion sections 21' and 22' and the shared memory 23 is illustrated as follows. Incidentally, FIG. 10 is an example in which, for the I/P conversion, both of the first and second I/P conversion sections 21' and 22' use the image data obtained from four fields.

At the moment when the image data of a field N is supplied, the first I/P conversion section 21' for the current field conducts I/P conversion using data of fields (N−3) to N, meanwhile the second I/P conversion section 22' for the previous field conducts I/P conversion using data of fields (N−4) to (N−1).

Thus, in this case, the shared memory 23 has to store the image data of five field from the field (N−4) to the field N so as to include five field memories 23a to 23e. That is, in the arrangement in FIG. 10, when I/P conversion is conducted using the image data of m fields in each of the first I/P conversion section 21' and the second I/P conversion section 22', only m+1 field memories are required rather than 2m field memories, and this makes it possible to reduce the costs.

Also, although the image data is initially supplied to the shared memory 23 in the arrangement in FIG. 10, it may be arranged such that the data is written in the shared memory 23 after being supplied to the first I/P conversion section 21' or the second I/P conversion section 22'. When the next field N+1 is supplied, the data is rewritten in a field memory storing the data of the field N−4.

Figure 11:
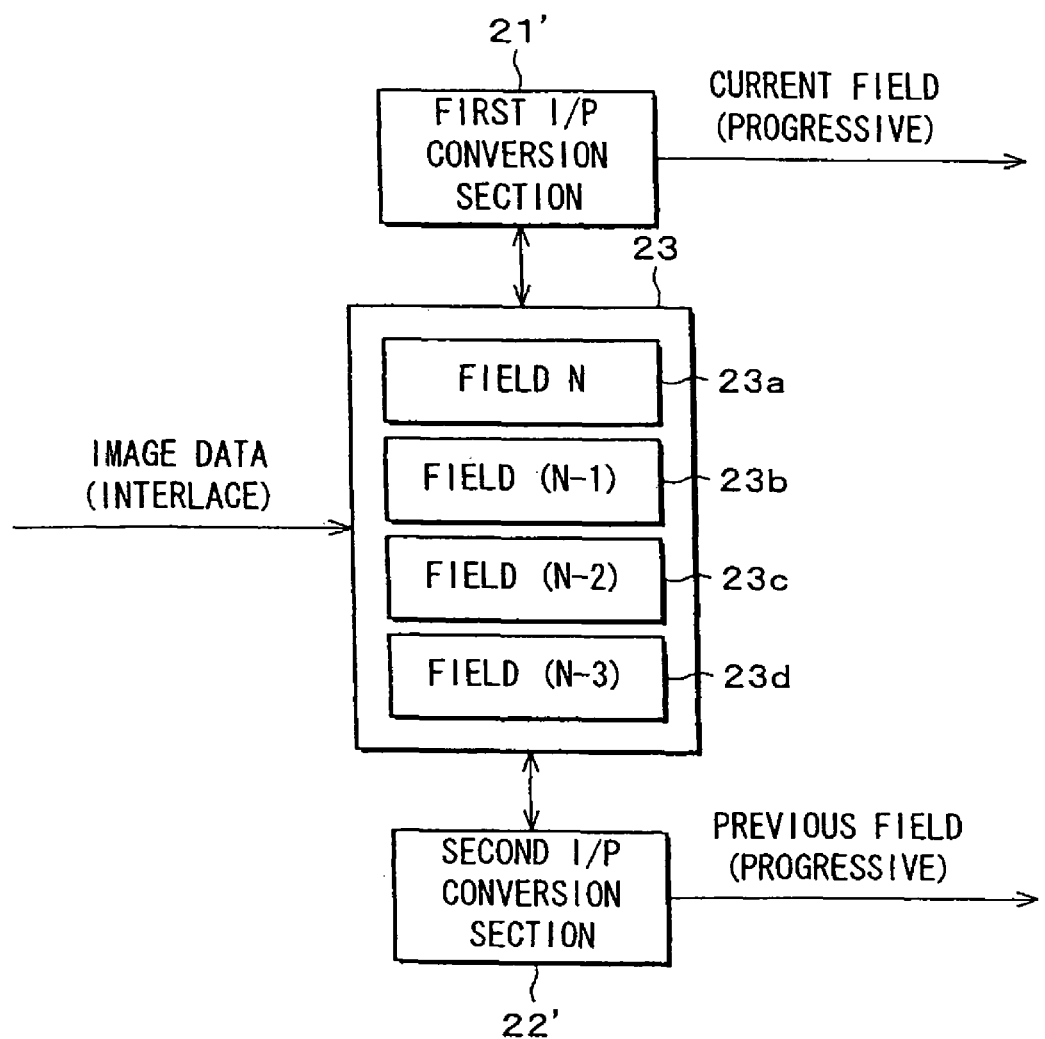
FIG. 11 is a block diagram, illustrating another example of a concrete arrangement of the image processing circuit in FIG. 9.

Furthermore, as a derivative of the arrangement in FIG. 10, there is an arrangement shown in FIG. 11. In this arrangement, the first I/P conversion section 21' conducts the I/P conversion using the image data of four fields whereas the second I/P conversion section 22' conducts the I/P conversion using the image data of three fields.

At the moment when the image data of the field N is supplied, the first I/P conversion section 21' for the current field conducts I/P conversion using data of the fields (N−3) to N whereas the second I/P conversion section 22' for the previous field conducts the I/P conversion using the data of the fields (N−3) to (N−1). However, it is not always necessary to use the data of all fields from (n−3) to (N−1) for conducting the I/P conversion in the first and second I/P conversion sections 21' and 22'.

In other words, when the first I/P conversion section 21' for the current field conducts the I/P conversion using the data of m fields (m=4 in an example of the first I/P conversion section 21'), no appropriate I/P conversion using the data of (m−1) fields could be available under a certain situation of the I/P conversion in the second I/P conversion section 22'. That is, currently IP conversion sections are made as custom chips so that among the ones for the IP conversion by field comparison, there is even a type of the section which can access eight previous fields. However, all types of the sections from the one for one field to the one for eight fields are not always available, and hence, for instance, there may be a case such that although a conversion circuit conducting IP conversion by accessing previous eight (=m) fields is available, a conversion circuit conducting IP conversion by accessing previous seven fields (=M−1) is not available.

In this kind of case, the same effect can be expected from the I/P conversion using the data of more than one field and less than (m−1) fields.

Thus, in this case, the shared memory 23 is required to store the image data of four fields from the field (N−3) to the field N, so as to include four field memories 23a to 23d. In other words, in comparison with the arrangement illustrated in FIG. 10, the arrangement shown in FIG. 11 makes it possible to further reduce a memory for one field by reducing the number of fields used in the I/P conversion conducted in the first I/P conversion section 22' to be a field less than the number in the first I/P conversion section 21'.

Moreover, as a further derivative of the arrangement in FIG. 11, there is an arrangement in which the I/P conversion section is shared. In this arrangement illustrated in FIG. 12, the second I/P conversion section 22' is omitted from the arrangement in FIG. 11, and a first I/P conversion section (current field I/P conversion section, previous field IP conversion section) 21" outputs progressive signals of both the previous and current fields.

When I/P conversion is conducted in the first I/P conversion section 21" using image data of more than one field, the image data of the more than one field is not supplied to the first I/P conversion section 21" at once but successively supplied from the oldest data to the newest data.

Figure 12:
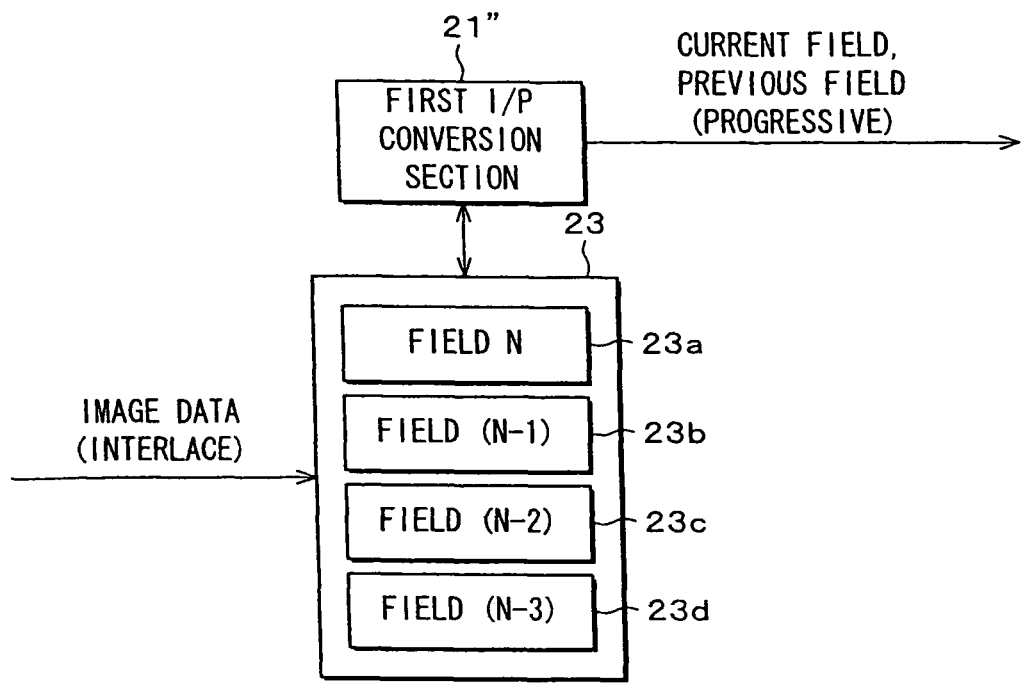
FIG. 12 is a block diagram, illustrating a further example of an arrangement of the image processing circuit.

That is to say, in the arrangement shown in FIG. 12, when the I/P conversion in the current field is conducted using the image data of four fields while the I/P conversion in the previous field as in the arrangement in FIG. 11 is conducted using the image data of three fields, first of all, progressive signals in the previous fields are calculated so as to be output at the moment when interlace signals in the fields N−3 to N−1 are supplied from the memory 23 to the first I/P conversion section 21". After receiving interlace signals of the field N, progressive signals of the current field can be calculated so as to be output.

The arrangement in FIG. 12 makes it possible to not only reduce costs by sharing the memory but also simplify the arrangement of the image processing circuit by sharing the I/P conversion section. However, in this case, there is a time-lag between the set of the image data of the current field and that of the previous field, these sets of the data being supplied from the first I/P conversion section 21", so that an arrangement to synchronize these two is necessary. The arrangement in which the time-lag between the image data of the current field and that of the previous field does not occur and at the same time the I/P conversion section can be shared is such as an arrangement illustrated in FIG. 13.

Figure 13:
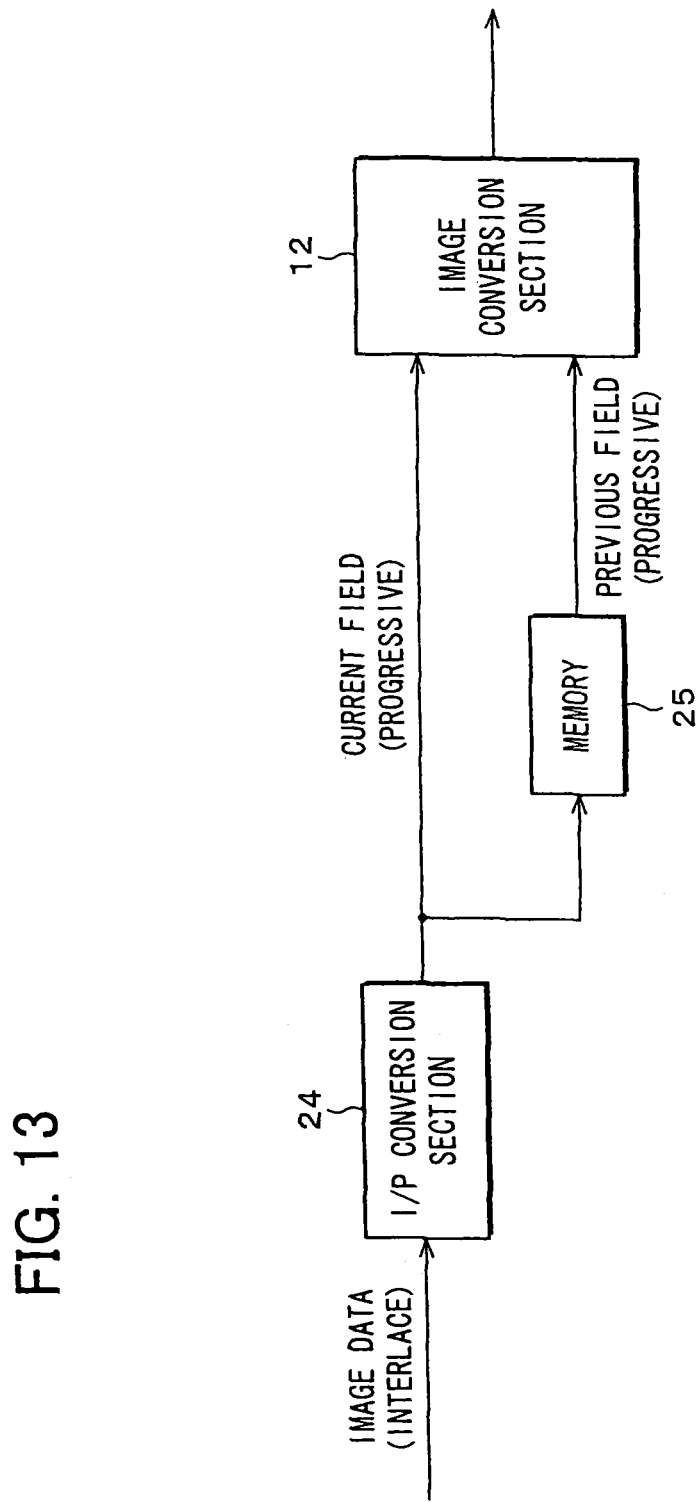
FIG. 13 is a block diagram, illustrating yet another example of an arrangement of the image processing circuit.

In the arrangement of FIG. 13, the image data supplied to the image processing circuit is initially input to an I/P conversion section (current field I/P conversion section, previous field I/P conversion section) 24 to be converted from interlace signals to progressive signals. The progressive signals are divided after being output from the I/P conversion section 24. One set of the signals is directly supplied to the image processing section 12 as the data of the current field, whereas the other set of the signals is temporarily stored in a memory (memory for delaying data) 25 and then supplied to the image processing section 12 as the data of the previous field, after one field delay from the current field.

Moreover, in the arrangement in FIG. 13, provided that the I/P conversion section 24 conducts the I/P conversion using the image data of m fields, the I/P conversion section 24 includes field memories (unillustrated) enough for m fields. Furthermore, since a field memory for one field is used as the memory 25 for storing the data of the previous field, the total number of the field memories is m+1. On This account, the effect of cost-cutting by reducing the number of memories in this arrangement is equal to the arrangement in FIG. 10. However, in the arrangement in FIG. 12, even the I/P conversion section 24 can be shared between the current field and the previous field so that this arrangement makes it possible to further simplify the arrangement of the image processing circuit, compared to the arrangement in FIG. 10.

Figure 21:
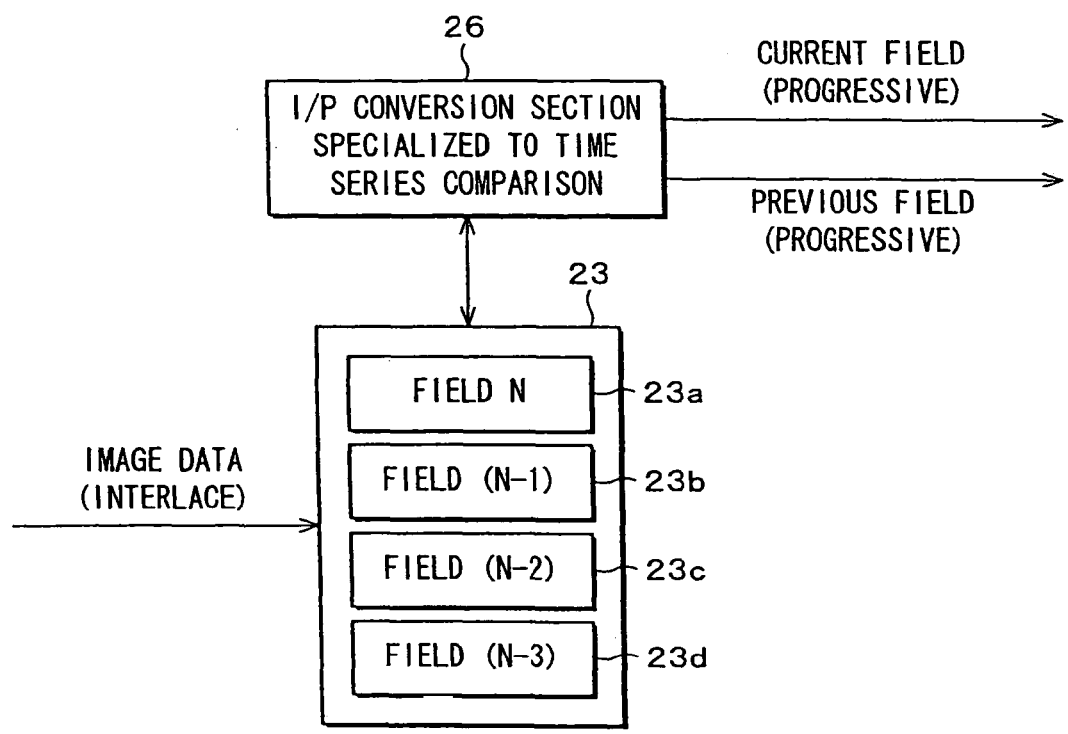
FIG. 21 is a block diagram, illustrating an arrangement of the image processing circuit, which is different from the arrangement in FIG. 12.

Alternatively, as FIG. 21 illustrates, instead of the first I/P conversion section 21' in FIG. 12, it is possible to use an ad-hoc (i.e. specialized to time series comparison) I/P conversion section 26 which is modified to output the image data of the present and previous fields at once. Being different from the first I/P conversion section 21' in FIG. 12, the I/P conversion section 26 is arranged so that the time-lag between the image data of the current field and that of the previous field does not occur. Thus it is not necessary to adopt the arrangement in FIG. 13 for synchronizing the image data of the current field and that of the previous field (i.e. the memory 25), so that the arrangement of the image processing circuit is further simplified.

Although the descriptions above illustrate the image processing section 12 conducting the overshoot drive including time series data comparison, the image processing circuit of the present invention is not limited to this so that the above can be applied to an image processing circuit for conducting white balance correction including spatial data comparison or color correction.

Figure 14:
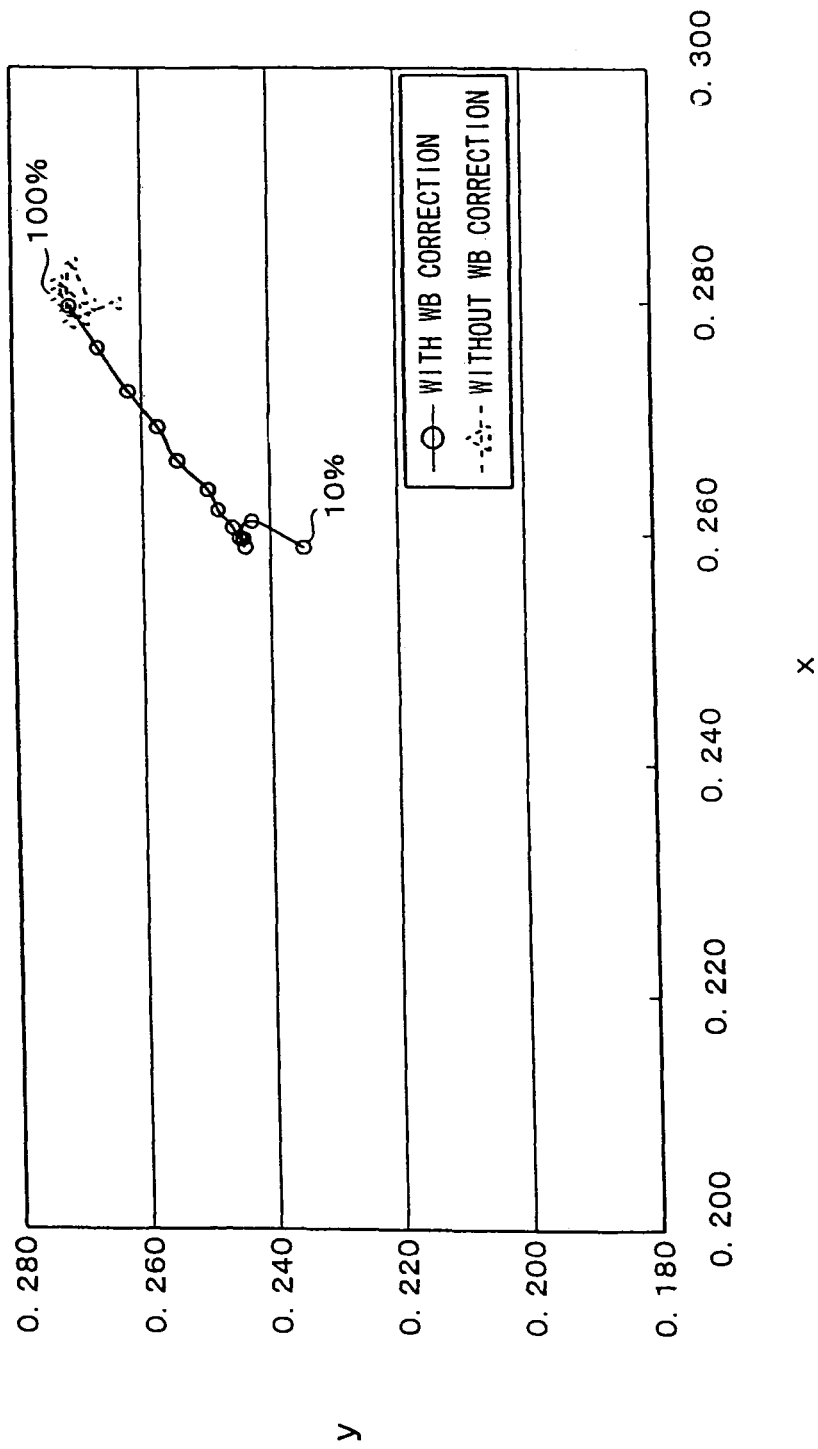
FIG. 14 is a graph indicating a relationship between the transmittance and the change of the chromaticity, when white balance correction is conducted.

A liquid crystal panel loses the balance of RGB luminance due to wavelength dispersion when the transmittance (gradation) of the pixel is altered. Thus as a full line in FIG. 14 shows, white chromaticity coordinates change in accordance with the change of transmittance. Incidentally, vertical and horizontal axes in FIG. 14 indicate the chromaticity coordinates, and FIG. 14 illustrates a plurality of plot during the change of the transmittance from 10% to 100% being linked. The figure shows that the chromaticity increases towards the upper right in accordance with the increase of the transmittance. In other words, this indicates that the brighter a color, the more dense yellow of the color becomes.

However, basically it is preferable that the chromaticity coordinates do not change even if the transmittance is changed. Thus there is a process termed white balance coordination to regulate the balance of RGB luminance and keep the chromaticity coordinates stable by respectively controlling the graduation voltages of R, G, and B in accordance with the transmittance.

When the white balance correction (WB correction) is conducted, as a dashed line in FIG. 14 indicates, the chromaticity coordinates hardly change even if the transmittance (gradation) of the pixel is changed.

A color liquid crystal panel is arranged such that sub-pixels for R, G, and B are aligned in one color pixel, and hence the comparison of the gradation values of these sub-pixels is necessary in the white balance correction. However, the correction of a single color pixel without considering harmony with surrounding pixels could upset the balance of the whole image. Thus, to display an image with higher precision and more vivid color, it is necessary to compare colors between neighboring color pixels (including ones on the adjacent scanning line) and conduct the white balance correction in consideration of the balance of the image.

In this manner, even when the image processing circuit conducts the white balance correction by spatial data comparison, if image data to be supplied to the image processing circuit is interlace signals, there is a possibility such that a part of the data to be compared does not exist in the same field, when conducting the data comparison between neighboring lines. In this case the precision of the white balance correction is decreased.

In the meantime, in the image processing circuit in accordance with the present invention, conducting I/P conversion before conducting the white balance correction in the image processing section makes it possible to use progressive signals without the dropout of the data in the image processing section. As a result, it is possible to improve the precision of the white balance correction.

Generally, the color reproduction range of a conventional image display device is often different from the range that the sender of the image expects, due to device characteristics. This kind of image display device produces an image with a color being different from a color that the sender expects.

Color correction is a process to solve the above-identified problem, so that referring to R, G, and B signals of each pixel, R, G, and B signals after modification of the device characteristics can be output without losing the white balance. Of course the color correction does not change the color reproduction range of the image display device so that only colors within the color reproduction range are corrected. Thus the effect does not reach colors beyond the reproduction range of the image display device, but within the range a color that the sender expects can be almost reproduced.

Comparison between the graduation values of the sub-pixels aligned in accordance with R, G, and B is also necessary in the color correction, and data comparison between spatially continuous pixels is included in the comparison above (the color correction may include time series data comparison). However, also in the color correction, correction of a single color pixel without considering harmony with surrounding pixels could upset the balance of the whole image. Thus, to produce an image with higher precision and more vivid color, it is necessary to compare colors between neighboring color pixels (including ones on the adjacent scanning line) and conduct the color correction in consideration of the balance of the image.

Therefore, provided that image data supplied to the image processing circuit is interlace signals, when data comparison is done between adjacent lines, there is a case in which a part of the image data to be compared does not exist in the same field. In this case the precision of the image processing is decreased.

Thus, if the present invention is applied for the color correction, conducting the I/P conversion before the color correction in the image processing section makes it possible to use progressive signals without the dropout of the data in the image processing section. On this account, it is possible to improve the precision of the color correction.

Figure 15:
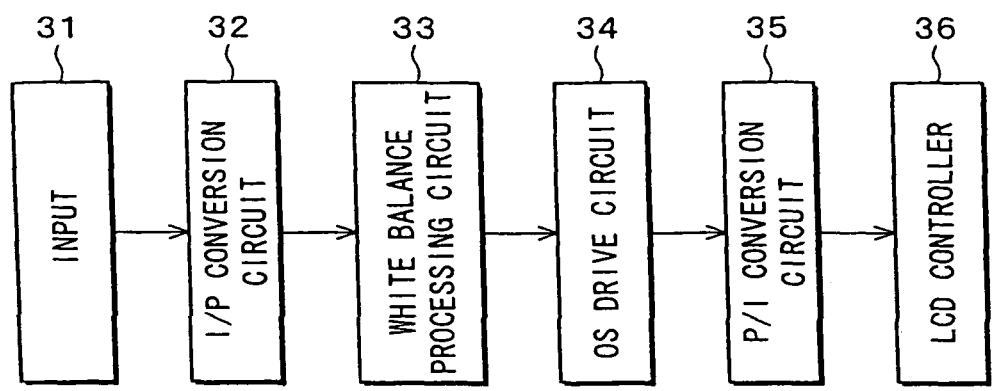
FIG. 15 is a block diagram, briefly illustrating an image processing device adopting the image processing circuit of the present invention.
Figure 16:
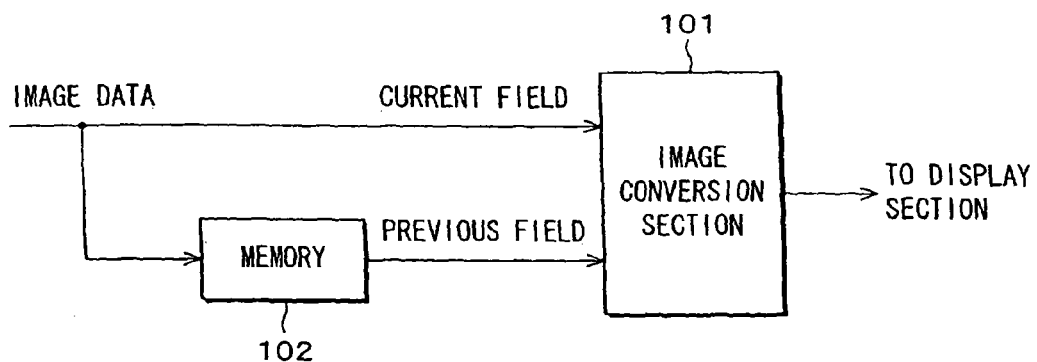
FIG. 16 is a block diagram, illustrating an arrangement of a conventional image processing circuit.

Now, using a commercial liquid crystal display device, an image processing device in which the image processing circuit in accordance with the present invention is mounted before an LCD (Liquid Crystal Display) controller is examined. The image processing device as illustrated in FIG. 15 includes: an input circuit 31; an I/P conversion circuit 32; a white balance processing circuit 33; an overshoot drive circuit (OS drive circuit) 34; a P/I conversion circuit 35; and an LCD controller 36. Incidentally, in this arrangement, the I/P conversion circuit 32 is equivalent to the I/P conversion means, and the white balance processing circuit 33 and the overshoot drive circuit 34 are equivalent to the image processing means.

To check the display ability of the liquid crystal display device, the display characteristics of a conventional arrangement using an image processing device in which the I/P conversion circuit 32, the white balance processing circuit 33, the overshoot drive circuit 34, and the P/I conversion circuit 35 being omitted from the arrangement in FIG. 15 was compared with the characteristics of an arrangement of the present invention in which the image processing circuit in FIG. 15 is used. Consequently, it was proved that the liquid crystal display adopting the present invention has quicker response speed, better ability of displaying moving images, and smaller change of color due to the gradation, as Table 1 shows.

TABLE 1

| | CONVENTIONAL ARRANGEMENT | ARRANGEMENT OF THE PRESENT INVENTION |
|---|---|---|
| RESPONSE SPEED OF THE LIQUID MATERIAL | 30 msec (70 msec) HALFTONES | 15 msec |
| CHANGE OF CHROMATICITY COORDINATES IN ACCORDANCE WITH TRANSMITTANCE (BETWEEN 100%-10%) | X = 0.02 Y = 0.04 | X = 0.00 Y = 0.01 |

To solve the above-identified problems, an image processing circuit of a first arrangement in accordance with the present invention, to which interlace image data is supplied and in which the image data is subjected to image processing including time series comparison or spatial data comparison, includes: I/P conversion means for converting the interlace image data, which has been supplied, to progressive image data; and image processing means for subjecting the image data, which has been subjected to conversion to the progressive data by the I/P conversion means, to image processing, wherein the I/P conversion means creates new data, in each field of the interlace image data, which is used for interpolation so that the number of fields of whole image data does not vary during converting the interlace image data to the progressive image data, and a line to be interpolated by I/P conversion receives data in accordance with calculation using data of at least one line located before and after the line to be interpolated in a sub-scanning direction.

Moreover, the image processing circuit of the first arrangement may be arranged so that the image processing means conducts the image processing including time series data comparison, and the I/P conversion means supplies interpolation data to a line to be interpolated by the I/P conversion, in accordance with the calculation using (a) data of at least one line located before and after the line to be interpolated in a sub-scanning direction and (b) data of at least one field which is located before and after a field including the line to be interpolated.

According to the above-identified arrangement, furthermore, to a line to be interpolated by I/P conversion, interpolation data is supplied in accordance with the calculation using (a) data of at least one line located before and after the line to be interpolated in a sub-scanning direction and (b) data of at least one field which is located before and after a field including the line to be interpolated. On this account, it is possible to conduct more precise I/P conversion with movement compensation, by conducting not only spatial comparison (data comparison in the same field) but also data comparison between time series continuous fields. Thus it is possible to further improve the precision of the image processing.

Incidentally, when using the data of at least one line located before and after the line to be interpolated and the data of the line to be interpolated, it is not necessary to use the data of both the previous and subsequent lines so that the interpolation may be done using the data of only the lines before the line to be interpolated.

To solve the above-identified problems, an image processing circuit of a second arrangement in accordance with the present invention, to which interlace image data is supplied and in which the supplied image data is subjected to image processing, includes: I/P conversion means for converting the interlace image data, which has been supplied, to progressive image data; and image processing means for subjecting the image data, which has been subjected to conversion to the progressive data by the I/P conversion means, to image processing in relation to overshoot drive.

Moreover, to solve the above-identified problems, an image processing circuit of a third arrangement in accordance with the present invention, to which interlace image data is supplied and in which the supplied image data is subjected to image processing, includes: I/P conversion means for converting the interlace image data, which has been supplied, to progressive image data; and image processing means for subjecting the image data, which has been subjected to conversion to the progressive data by the I/P conversion means, to color correction as image processing, in the color correction correcting device characteristics of display means for displaying image.

Furthermore, to solve the above-identified problems, an image processing circuit of a fourth arrangement in accordance with the present invention, to which interlace image data is supplied and in which the supplied image data is subjected to image processing, includes: I/P conversion means for converting the interlace image data, which has been supplied, to progressive image data; and image processing means for subjecting the image data, which has been subjected to conversion to the progressive data by the I/P conversion means, to white balance correction as image processing.

In the image processing circuits of the first to third arrangements may be arranged so that the image processing means conducts the image processing including the time series data comparison, and the I/P conversion means independently includes a current field I/P conversion section for subjecting the image data of the current field to the I/P conversion and a previous field I/P conversion section for subjecting the image data of the previous field to the I/P conversion.

According to this arrangement, the I/P conversion is respectively given for: (a) the image data of the current field which is the latest image data supplied to the image processing circuit; and (b) the image data of the previous field which is one field before the image data of the current field. On this account, it is possible to obtain the image data in two consecutive fields (i.e. the image data of the present and previous fields), the data being used for the time series data comparison in the image processing means.

Moreover, the image processing circuit may be arranged so that the I/P conversion means conducts the I/P conversion including the time series data comparison in both the current field I/P conversion section and the previous field I/P conversion section.

According to this arrangement, it is possible to conduct more precise I/P conversion with movement compensation in both the current field I/P conversion section and the previous field I/P conversion section, so that the image processing in the image processing means using the result of the above becomes more precise.

Moreover, the image processing circuit may be arranged so that the I/P conversion means conducts the I/P conversion not including the time series data comparison in both the current field I/P conversion section and the previous field I/P conversion section.

According to this arrangement, since both the current field I/P conversion section and the previous field I/P conversion section do not include the time series data comparison in the I/P conversion, in this case a memory for the time series data comparison is unnecessary, unlike the case in which the time series data comparison is included. Thus it is possible to reduce the costs of the circuit.

Moreover, the image processing circuit may be arranged so that the I/P conversion means conducts the I/P conversion including the time series data comparison in the current field I/P conversion section, while the means conducts the I/P conversion not including the time series data comparison in the previous field I/P conversion section.

According to this arrangement, since either one of the current field I/P conversion section and the previous field I/P conversion section conducts the I/P conversion including the time series data comparison, the costs are lower than the case in which the time series data comparison is included in both of the sections, while the precision of the image is better than the case in which the time series data comparison is included in neither of the sections.

Especially in the case of the overshoot drive, the image processing by the image processing means is greatly susceptible to the precision of the image data of the current field rather than the precision of the previous field so that conducting the I/P conversion including the time series data comparison in the current field I/P conversion section is effective for improving the precision of the image processing.

Moreover, the image processing circuit is preferably arranged so that the I/P conversion means includes a memory shared by the current field I/P conversion section and the previous field I/P conversion section.

According to this arrangement, when the I/P conversion including the time series data comparison is conducted in both of the current field I/P conversion section and the previous field I/P conversion section, it is necessary to include a memory for storing image data until the image data, which is supplied to the current field I/P conversion section and the previous field I/P conversion section, is used for the data comparison. In this case a part of the data used in the I/P conversion in the current field I/P conversion section is identical with a part of the data used in the I/P conversion in the previous field I/P conversion section so that it is possible to share the memory storing the interchangeable data and reduce the costs of the circuit.

Furthermore, the image processing circuit is preferably arranged so that, in the I/P conversion means, the current field I/P conversion section conducts the I/P conversion using data of m fields whereas the previous field I/P conversion section conducts the I/P conversion using data of not less than one and not more than (m−1) field (s).

According to this arrangement, the data used in the I/P conversion in the previous field I/P conversion section is completely included in the data used in the I/P conversion in the current field I/P conversion section. Thus it is possible to minimize the use of the memory for the time series data comparison and reduce the costs of the circuit.

However, the preferable I/P conversion using the data of (m−1) fields may not available under a certain situation of the I/P conversion. In such a case a similar effect can be obtained from the I/P conversion using the data of not less than one and not more than (m−1) field(s).

In the image processing circuit, the image processing means conducts the image processing including the time series data comparison, and hence the image processing means may be arranged so that the progressive signal converted by the I/P conversion means is, before being supplied to the image processing means, divided into: (a) the image data of the current field which is directly supplied to the image processing means; and (b) the image data of the previous field which is temporarily stored in a memory for delaying data by one field and then supplied to the image processing means.

According to this arrangement, the I/P conversion with respect to the image data of the current field and the I/P conversion with respect to the image data of the previous field are conducted in the same I/P conversion means so that the arrangement of the image processing circuit is simplified, in addition to the cost-cutting due to the sharing of the memory.

Moreover, the image processing circuit may be arranged so that the image processing means conducts the image processing including the time series data comparison, and the I/P conversion means creates the image data of the current field and that of the previous field using the data of at least one field so as to supply the image data of the previous field and that of the current field, the interpolation data being added to the image data, simultaneously to the image processing means in a following stage.

According to this arrangement, the I/P conversion with respect to the image data of the current field and the I/P conversion with respect to the image data of the previous field are conducted by the same I/P conversion means, and the image data of the current field and that of the previous field, the image data being created (to which the interpolation data is added) by the I/P conversion means, are simultaneously supplied to the image processing means in a following stage. That is to say, there is no time-lag between the input of the image data of the previous field and the input of the image data of the current field, the data being used for the image processing in the image processing means.

Thus, in the image processing means, it is unnecessary to adopt a memory for delaying data, etc. which is used for synchronizing the input of the image data of the previous field and the input of the image data of the current field, so that it is possible to simplify the arrangement of the image processing circuit, in addition to the cost-cutting of the memory.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An image processing method, comprising:
   receiving time series input image data groups including a plurality of input image data,
   generating a plurality of interpolated image data based on the input image data groups,
   combining the input image data and the interpolated image data and forming time series progressive image data groups,
   subjecting each of the progressive image data groups to image processing in relation to overshoot drive based on at least consecutive two of the progressive image data groups,
   wherein,
   the image processing in relation to overshoot drive includes the modulation of data based on one of the input image data located in a first line of a first progressive image data group and one of the interpolated image data located in the first line of a second progressive image data group next to the first progressive image data group.

2. The image processing method of claim 1, wherein the generating a plurality of interpolated image data includes comparing data for different lines of the input image data groups.

3. The image processing method of claim 1, wherein the interpolated image data is generated based on a first input image data for a first field and a second input image data for a second field next to the first field.

4. The image processing method of claim 1, wherein the interpolated image data is generated based on a first input image data of a first field, a second input image data of a second field preceding the first field and a third input image data of a third field next to the second field.

* * * * *